(12) United States Patent  (10) Patent No.: US 12,006,444 B2
Kuo  (45) Date of Patent: Jun. 11, 2024

(54) WATER-BREAKABLE RESIN FORMULATION

(71) Applicant: Formlabs, Inc., Somerville, MA (US)

(72) Inventor: Cheying Kuo, Lexington, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 17/569,070

(22) Filed: Jan. 5, 2022

(65) Prior Publication Data

US 2022/0213329 A1  Jul. 7, 2022

Related U.S. Application Data

(60) Provisional application No. 63/133,954, filed on Jan. 5, 2021.

(51) Int. Cl.
| | |
|---|---|
| C09D 4/00 | (2006.01) |
| B29C 64/118 | (2017.01) |
| B29C 64/124 | (2017.01) |
| B33Y 10/00 | (2015.01) |
| B33Y 70/00 | (2020.01) |
| C08F 220/34 | (2006.01) |
| C08K 3/36 | (2006.01) |
| C09D 7/40 | (2018.01) |
| C09D 7/61 | (2018.01) |
| C09D 133/14 | (2006.01) |

(52) U.S. Cl.
CPC .............. *C09D 4/00* (2013.01); *B29C 64/118* (2017.08); *B29C 64/124* (2017.08); *B33Y 10/00* (2014.12); *B33Y 70/00* (2014.12); *C08F 220/343* (2020.02); *C08K 3/36* (2013.01); *C09D 7/61* (2018.01); *C09D 7/68* (2018.01); *C09D 7/69* (2018.01); *C09D 133/14* (2013.01); *C08F 2800/20* (2013.01); *C08F 2810/20* (2013.01); *C08K 2201/005* (2013.01)

(58) Field of Classification Search
None
See application file for complete search history.

(56) References Cited

U.S. PATENT DOCUMENTS

| | | |
|---|---|---|
| 6,070,107 A | 5/2000 | Lombardi et al. |
| 8,470,231 B1 | 6/2013 | Dikovsky et al. |
| 10,328,635 B1 | 6/2019 | Osiroff et al. |
| 2017/0130048 A1 | 5/2017 | Hirsch et al. |

FOREIGN PATENT DOCUMENTS

| | | | | |
|---|---|---|---|---|
| CA | 3145257 A1 | * | 1/2021 | ............. B33Y 70/00 |
| CN | 106147095 A | | 11/2016 | |

OTHER PUBLICATIONS

Liska et al., Water-soluble photopolymers for rapid prototyping of cellular materials. Journal of Applied Polymer Science. Sep. 15, 2005;97(6):2286-98.
Witls et al., Vat photopolymerization of charged monomers: 3D printing with supramolecular interactions. Polymer Chemistry. 2019;10(12):1442-51.

* cited by examiner

*Primary Examiner* — Colin W. Slifka
(74) *Attorney, Agent, or Firm* — Wolf, Greenfield & Sacks, P.C.

(57) ABSTRACT

A resin formulation that may be used for additive manufacturing, for example, to provide a water-breakable object is generally described.

25 Claims, 3 Drawing Sheets

WATER-BREAKABLE RESIN FORMULATION

CROSS REFERENCE TO RELATED APPLICATIONS

The present application claims the benefit under 35 U.S.C. § 119(e) of U.S. Provisional Patent Application No. 63/133,954, filed Jan. 5, 2021, titled "WATER-BREAKABLE RESIN FORMULATION," which is hereby incorporated by reference in its entirety.

TECHNICAL FIELD

A resin formulation that may be used for additive manufacturing, for example, to provide a water-breakable object is generally described.

BACKGROUND

Additive manufacturing techniques, such as three-dimensional (3D) printing, may be used to fabricate objects by solidifying a resin formulation at specific locations and subsequently forming successive layers on top of the solidified materials. A support material is often used during the additive manufacturing process to provide a temporary support for an object being produced. The support material is used to support specific areas of the object during building and for assuring adequate vertical placement of subsequent layers of the object. The support materials are typically removed after the printing process to reveal the fabricated object. Removal of the support material, however, may be labor intensive, time-consuming, and risks damaging the fabricated object.

Accordingly, there is a need for expanded compositions and methods related to applications of additive manufacturing.

SUMMARY

A resin formulation that may be used for additive manufacturing, for example, to provide a water-breakable object is generally described. The subject matter of the present invention involves, in some cases, interrelated products, alternative solutions to a particular problem, and/or a plurality of different uses of one or more systems and/or articles.

According to some embodiments, a resin for additive manufacturing is described, the resin comprising: an ionic component in an amount between greater than or equal to 20 wt. % and less than or equal to 95 wt. %, wherein the ionic component comprises a vinyl, acrylate, methacrylate, or acrylamide moiety; an oligomer in an amount between greater than or equal to 1 wt. % and less than or equal to 45 wt. %; a monomer in an amount between greater than or equal to 1 wt. % and less than or equal to 45 wt. %; and a crosslinking agent in an amount between greater than or equal to 1 wt. % and less than or equal to 30 wt. %.

In certain embodiments, a method of additive manufacturing is described, the method comprising providing a resin and forming a three-dimensional object from the resin by additive manufacturing. In some embodiments, the resin comprises: an ionic component comprising a vinyl, acrylate, methacrylate, or acrylamide moiety; an oligomer; a monomer; and a crosslinking agent.

In some embodiments, a method of additive manufacturing is described, the method comprising providing a resin and forming a three-dimensional object from the resin by additive manufacturing, wherein the three-dimensional object is water-breakable. In certain embodiments, the resin comprises: an ionic component; an oligomer; a monomer; and a crosslinking agent.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1A:
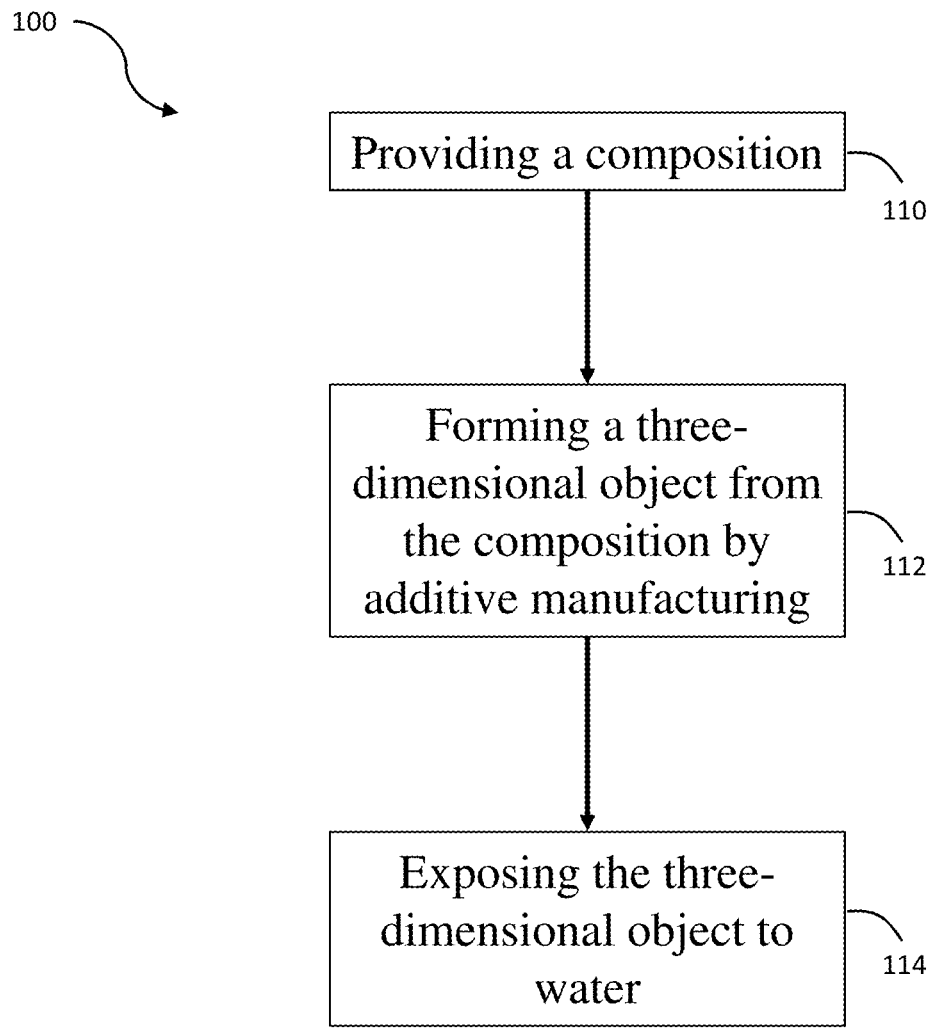
FIG. 1A shows, according to certain embodiments, a scheme depicting a method of additive manufacturing.

A resin formulation that may be used for additive manufacturing is described herein. The resin formulation may include multiple components, including an ionic component, an oligomer, and a crosslinking agent. As described in further below, the resin formulation is designed such that a resulting cured material obtained from the additive manufacturing process is at least water-breakable, and in some cases, water-soluble, upon exposure of the cured material to an aqueous solution (e.g., water). The resin formulations described herein may therefore be used to provide a material by additive manufacturing that can be easily broken, dissolved, and/or removed by exposing the material to water. Furthermore, upon exposure to water, the material may break and/or dissolve within short time periods (e.g., ranging from minutes to hours), as described herein in greater detail. Such breakability provides advantages over conventional systems, which may require extended time periods, expensive equipment, high temperatures, and/or intensive procedures to afford removal of material.

The resin formulation described herein may, in some embodiments, be used to provide a support material (e.g., by additive manufacturing) for the subsequent additive manufacturing of a desired 3D object, for example, on the support material. In some such embodiments, the desired object that is subsequently fabricated on the support material may be made from the same or a different resin formulation. In certain embodiments in which a different resin formulation is used to fabricate the object on the support material, the entire material (i.e., support material and desired object)

may be exposed to water in order to break and/or solubilize the support material from the desired object. In some embodiments in which the same resin formulation is used to fabricate the desired object on the support material, only the support material is exposed to water in order to avoid breaking and/or solubilizing the desired object.

As used herein, the term "water-breakable" is given its ordinary meaning in the art and generally refers to the capability of a material (e.g., a polymeric and/or crosslinked material) to break upon exposure to and/or immersion in an aqueous solution (e.g., water). In some embodiments, a water-breakable material breaks upon static immersion in water. The water-breakable material may, in certain embodiments, break spontaneously, namely, without applying any physical or mechanical force other than exposing and/or immersing the water-breakable object in an aqueous solution (e.g., water).

The term "break" or "breakable" as used herein generally refers to the capability of a material (e.g., a polymeric and/or crosslinked material) to physically decompose (as opposed, for example, to chemical degradation). In some embodiments, the water-breakable material decomposes, or breaks, into pieces, as described herein in further detail.

As used herein, the term "water-soluble" is given its ordinary meaning in the art and generally refers to the capability of a material (e.g., a polymeric and/or crosslinked material) to form a homogeneous solution when mixed with water in equal volumes or weights.

As described above, the resin formulation includes a combination of components, including, for example, an ionic component, an oligomer, and a crosslinking agent. According to some embodiments, the object produced from the resin formulation by additive manufacturing may comprise a crosslinked polymeric network formed by a plurality of covalent and/or ionic interactions (e.g., covalent bonds, ionic bonds, hydrogen bonds, etc.) between the components of the resin formulation. The crosslinked polymeric network may, in some embodiments, be capable of swelling (e.g., absorbing) water, which may assist in the ability to breakdown and/or solubilize the object. Without wishing to be bound by theory, upon contacting the object with water, water molecules may enter between the polymeric chains and interfere with the covalent and/or ionic interactions, therefore breaking down the crosslinked polymeric network of the material, as explained herein in greater detail.

The curable resin formulations described herein are therefore capable of forming a water-breakable and/or water-soluble material. Such formulations are particularly useful as support materials in additive manufacturing processes, such as, for example, stereolithography and/or photopolymer extrusion. The support materials can be easily removed upon immersion in water without subjecting a fabricated object to mechanical and/or chemical processing techniques that can adversely affect the fabricated object and/or are laborious or environmentally unfriendly.

As described herein, the composition may comprise an ionic component. As would generally be understood by a person of ordinary skill in the art, the ionic component may be a molecule that is composed of ions (e.g., cations and anions) held together by electrostatic forces (e.g., ionic bonding). The use of an ionic component may advantageously provide the composition with the ability to form ionic interactions between the ionic component and at least one other component of the resin formulation, as explained herein in further detail.

The ionic component may, in some embodiments, be a molecule comprising an ionic functional group. In some embodiments, for example, the ionic component is an ionic monomer. In certain other embodiments, the ionic component is an ionic polymer.

According to some embodiments, the ionic component comprises a positively charged (e.g., cationic) ion. In certain embodiments, for example, the ionic component comprises a positively charged moiety, such as, for example, an ammonium moiety (i.e., a $N^+(R^1)_4$ moiety, wherein $R^1$ is alkyl, alkenyl, alkynyl, carbocyclyl, heterocyclyl, aryl, or heteroaryl, any of which may be optionally substituted). In some embodiments, the ionic component comprises a choline moiety (i.e., a $(CH_3)_3N^+(CH_2)_2OR^1$ moiety, wherein $R^1$ is alkyl, alkenyl, alkynyl, carbocyclyl, heterocyclyl, aryl, or heteroaryl, any of which may be optionally substituted). For example, in certain non-limiting embodiments, the ionic component comprises methacroylcholine (e.g., methacroylcholine chloride) and/or polymers thereof. Other positively charged ions and/or moieties are also possible.

As would be understood by a person of ordinary skill in the art, the ionic component may be an ionic salt, such that the positively charged (e.g., cationic) ion may be balanced by a negatively charged (e.g., anionic) ion.

The ionic component may comprise any of a variety of suitable negatively charged ions. In some embodiments, for example, the ionic component comprises a sulfonate moiety (i.e., a $R^1$—$SO_3^-$ moiety). In certain non-limiting embodiments, for example, the ionic component comprises poly (vinyl sulfonate). The ionic component may comprise a halide ion (e.g., $F^-$, $Cl^-$, $Br^-$, or $I^-$), in certain embodiments. Due to the small atomic radius and chemical inertness, the halide ion may, in some embodiments, advantageously not interfere with other components of the composition during polymerization. Other negatively charged ions and/or moieties are also possible.

In certain embodiments, the ionic component comprises a vinyl, acrylate, methacrylate, or acrylamide moiety. For example, in some embodiments, one or more of $R^1$ may be or comprise a vinyl, acrylate, methacrylate, or acrylamide moiety. As explained in greater detail herein, a vinyl, acrylate, methacrylate, or acrylamide moiety may be employed in order to provide an ionic component with the ability to crosslink with one or more other components (e.g., (meth) acrylate-containing components) of the resin formulation by, for example, radical polymerization in the presence of an initiator.

The composition may comprise the ionic component in any of a variety of suitable amounts. In certain embodiments, for example, the composition comprises the ionic component in an amount greater than or equal to 20 wt. %, greater than or equal to 40 wt. %, greater than or equal to 60 wt. %, greater than or equal to 80 wt. %, or greater, based on the total weight of the composition. In some embodiments, the composition comprises the ionic component in an amount less than or equal to 95 wt. %, less than or equal to 80 wt. %, less than or equal to 60 wt. %, less than or equal to 40 wt. %, or less, based on the total weight of the composition. Combinations of the above recited ranges are also possible (e.g., the composition comprises the ionic component in an amount between greater than or equal to 20 wt. % and less than or equal to 95 wt. % based on the total weight of the composition). Other ranges are also possible.

As described herein, the composition may comprise an oligomer. In some embodiments, for example, the composition comprises a urethane (meth)acrylate oligomer (e.g., a urethane acrylate oligomer, a urethane methacrylate oligomer). In certain embodiments, the composition may comprise a monomer. For example, in some embodiments, the composition comprises a urethane (meth)acrylate monomer (e.g., a urethane acrylate monomer, a urethane methacrylate monomer).

A mixture of an oligomeric and monomeric component may advantageously assist in the ability to break or solubilize a three-dimensional object resulting from the composition in water. For example, in some embodiments, a composition comprising a mixture of an oligomer (e.g., a urethane (meth)acrylate oligomer) and a monomer (e.g., a urethane (meth)acrylate monomer) may be used to provide a three-dimensional object with less rigidity as compared to, for example, a composition that is otherwise equivalent but does not comprise the monomer. For example, in embodiments in which a composition that is otherwise equivalent but does not comprise the monomer is used to provide a three-dimensional object, oligomeric chain entanglement in the resulting three-dimensional object may prevent breakdown and solubilization of the three-dimensional object in water. In some embodiments, a composition comprising a mixture of an oligomer (e.g., a urethane (meth)acrylate oligomer) and a monomer (e.g., a urethane (meth)acrylate monomer) may be used to provide a three-dimensional object with more rigidity as compared to, for example, a composition that is otherwise equivalent but does not comprise the oligomer. For example, in some embodiments, a composition that is otherwise equivalent but does not comprise the oligomer may not be suitable for additive manufacturing due to a lack of rigidity.

In some embodiments, the oligomer and/or monomer (e.g., the urethane (meth)acrylate oligomer and/or monomer) may advantageously react (e.g., crosslink) with one or more other components (e.g., (meth)acrylate-containing components) of the resin formulation. In certain embodiments, for example, the (meth)acrylate moiety of the oligomer and/or monomer (e.g., urethane (meth)acrylate oligomer and/or monomer) may crosslink with the vinyl, acrylate, methacrylate, or acrylamide moiety of the ionic component under certain conditions (e.g., radical polymerization in the presence of an initiator, upon exposure to radiation), as explained herein in greater detail.

According to certain embodiments, the oligomer (e.g., the urethane (meth)acrylate oligomer) is water-dilutable but not water-soluble. As used herein, the term "water-dilutable" is given its ordinary meaning in the art and generally refers to a material that may be diluted with water, i.e., the concentration of the material may be reduced uniformly by addition of water. In certain embodiments, the oligomer (e.g., the urethane (meth)acrylate oligomer) may be water-dispersible, such that the material disperses uniformly in water but remains as a separate phase (that may, for example, be filtered), with water as the continuous phase. As would be understood by a person of ordinary skill in the art, a material that is infinitely water-dilutable disperses uniformly in water regardless of the volume of water relative to that of the infinitely water-dilutable material.

The composition may comprise the oligomer and/or monomer in any of a variety of suitable amounts. In certain embodiments, for example, the composition comprises the oligomer and/or monomer each in an amount greater than or equal to 1 wt. %, greater than or equal to 15 wt. %, greater than or equal to 30 wt. %, or greater, based on the total weight of the composition. In some embodiments, the composition comprises the oligomer and/or monomer each in an amount less than or equal to 45 wt. %, less than or equal to 30 wt. %, less than or equal to 15 wt. %, or less, based on the total weight of the composition. Combination of the above recited ranges are also possible (e.g., the composition comprises the oligomer and/or monomer each in an amount between greater than or equal to 1 wt. % and less than or equal to 45 wt. %). Other ranges are also possible.

As described herein, the composition comprises a crosslinking agent. As would generally be understood by a person of ordinary skill in the art, the crosslinking agent may be a molecule that is used to link one or more first components of the composition to one or more second components of the composition by the formation of chemical interactions (e.g., covalent bonds, ionic bonds) between the one or more first components of the composition, the crosslinking agent, and the one or more second components of the composition. As explained herein in greater detail, for example, the crosslinking agent may advantageously be used to form one or more chemical interactions (e.g., covalent bonds, ionic bonds) between the ionic component and the crosslinking agent and/or the oligomer and/or monomer (e.g., the urethane (meth)acrylate oligomer and/or monomer) and the crosslinking agent.

Any of a variety of suitable crosslinking agents may be utilized. In certain embodiments, the crosslinking agent comprises an anhydride moiety. For example, in some embodiments, the crosslinking agent comprising the anhydride moiety has the chemical structure $(R^2CO)_2O$, wherein $R^2$ is alkyl, alkenyl, alkynyl, carbocyclyl, heterocyclyl, aryl, or heteroaryl, any of which may be optionally substituted.

Utilizing a crosslinking agent comprising an anhydride moiety may be advantageous, in some embodiments, as anhydrides are susceptible to hydrolysis when exposed to water, as would generally be understood by a person of ordinary skill in the art. In some embodiments, for example, the anhydride (i.e., $(R^2CO)_2O$) moiety may react with water to provide two equivalents of the corresponding carboxylic acid (i.e., $R^2COOH$). In some embodiments, a three-dimensional object produced from the resin composition may have the ability to break upon exposure to water due the anhydride reactivity with water, as explained herein in greater detail.

In certain embodiments, $R^2$ may be or comprise a vinyl, acrylate, methacrylate, or acrylamide moiety. It may be beneficial to employ an anhydride (i.e., $(R^2CO)_2O$) crosslinking agent in which $R^2$ is or comprises a vinyl, acrylate, methacrylate, or acrylamide moiety because the crosslinking agent may react (e.g., crosslink) with one or more other components (e.g., (meth)acrylate-containing components) of the resin formulation. In certain embodiments, for example, the vinyl, acrylate, methacrylate, or acrylamide moiety of the anhydride-containing crosslinking agent may crosslink with the vinyl, acrylate, methacrylate, or acrylamide moiety of the ionic component and/or the oligomer and/or monomer (e.g., the urethane (meth)acrylate oligomer and/or monomer) under certain conditions (e.g., radical polymerization in the presence of an initiator, upon exposure to radiation), as explained herein in greater detail.

In certain non-limiting embodiments, the crosslinking agent comprises methacrylic anhydride, acetic anhydride, cis-1,2,3,6-tetrahydrophthalic anhydride, dodecenylsuccinic anhydride, and/or combinations thereof. Other crosslinking agents comprising an anhydride moiety are also possible.

According to some embodiments, the crosslinking agent comprises a silane moiety. In certain embodiments, for example, the crosslinking agent has the chemical structure $SiR^3_4$, wherein $R^3$ is independently hydrogen, alkyl, alkenyl, alkynyl, carbocyclyl, heterocyclyl, aryl, or heteroaryl, any of which may be optionally substituted.

In certain embodiments, the crosslinking agent comprises an alkoxy silane moiety. For example, in some embodiments, the crosslinking agent comprises an alkoxy silane having the structure $R^4_xSi(OR^5)_{4-x}$, wherein $R^4$, when present, is independently hydrogen, alkyl, alkenyl, alkynyl, carbocyclyl, heterocyclyl, aryl, or heteroaryl, any of which may be optionally substituted, and $R^5$ is independently an alkyl group (e.g., methyl, ethyl, propyl, and the like).

Utilizing a crosslinking agent comprising an alkoxy silane moiety may be advantageous, in some embodiments, as alkoxy silanes are susceptible to hydrolysis when exposed to water, as would generally be understood by a person of ordinary skill in the art. In some embodiments, for example, the alkoxy silane (i.e., $R^4_xSi(OR^5)_{4-x}$) moiety may react with water to provide $R^4_xSi(OH)_{4-x}$ and 4-x equivalents of $R^5$—OH. In some embodiments, a three-dimensional object produced from the resin composition may have the ability to break or solubilize upon exposure to water due to the reactivity of the alkoxy silane with water, as explained herein in greater detail.

According to some embodiments, the alkoxy silane-containing crosslinking agent may advantageously be capable of forming one or more hydrogen bonding interactions with water (e.g., between a partially negative oxygen atom of the alkoxy silane-containing crosslinking agent and a partially positive hydrogen atom of water). For example, a three-dimensional object formed from the resin formulation by additive manufacturing may have the ability to absorb water into the crosslinked polymeric network of the three-dimensional object by forming hydrogen bonds between the alkoxy silane-containing crosslinking agent and water. In some embodiments, such reactivity assists in the breakdown and/or solubilization of the three-dimensional object.

In some embodiments, the silane (e.g., alkoxy silane), may comprise a vinyl, acrylate, methacrylate, or acrylamide moiety. It may be beneficial to employ a silane (i.e., $SiR^3_4$, $R^4_xSi(OR^5)_{4-x}$) crosslinking agent in which at least one $R^3$ or $R^4$, when present, comprises a vinyl, acrylate, methacrylate, or acrylamide because the crosslinking agent may react (e.g., crosslink) with one or more other components (e.g., (meth) acrylate-containing components) of the resin formulation. In certain embodiments, for example, the vinyl, acrylate, methacrylate, or acrylamide moiety of the silane-containing crosslinking agent may crosslink with the vinyl, acrylate, methacrylate, or acrylamide moiety of the ionic component and/or the oligomer and/or monomer (e.g., the urethane (meth)acrylate oligomer and/or monomer) under certain conditions (e.g., radical polymerization in the presence of an initiator, upon exposure to radiation), as explained herein in greater detail.

According to certain embodiments, the crosslinking agent comprises a multi-functional (meth)acrylate (e.g., a multi-functional acrylate or a multifunctional methacrylate). The multi-functional (meth)acrylate may have any of a variety of suitable functionalities. For example, in certain embodiments, the crosslinking agent comprise a difunctional (meth) acrylate, a trifunctional (meth)acrylate, a tetrafunctional (meth)acrylate, or the like.

In some embodiments, the multi-functional (meth)acrylate has a molecular weight less than or equal to 1000 g/mol, less than or equal to 500 g/mol, less than or equal to 300 g/mol, or less.

It may be beneficial to employ a multi-functional (meth) acrylate crosslinking agent because the crosslinking agent may react (e.g., crosslink) with one or more other components (e.g., (meth)acrylate-containing components) of the resin formulation. In certain embodiments, for example, one or more (meth)acrylate moieties of the multi-functional (meth)acrylate crosslinking agent may crosslink with the vinyl, acrylate, methacrylate, or acrylamide moiety of the ionic component and/or the oligomer and/or monomer (e.g., the urethane (meth)acrylate oligomer and/or monomer) under certain conditions (e.g., radical polymerization in the presence of an initiator, upon exposure to radiation), as explained herein in greater detail.

In some non-limiting embodiments, the crosslinking agent is trimethylolpropane triacrylate (TMPTA), trimethylolpropane trimethacrylate (TMPTMA), pentaerythritol triacrylate, glycerol propoxylate (1PO/OH) triacrylate, and/or alkoxylated derivatives thereof (e.g., ethoxylated trimethylolpropane triacrylate (TMP(3EO)TA) and/or ethoxylated (4) pentaerythritol triacrylate). Other crosslinking agents comprising a multi-functional (meth)acrylate are also possible.

The composition may comprise the crosslinking agent in any of a variety of suitable amounts. In some embodiments, for example, the composition comprises the crosslinking agent in an amount greater than or equal to 1 wt. %, greater than or equal to 3 wt. %, greater than or equal to 5 wt. %, greater than or equal to 10 wt. %, greater than or equal to 15 wt. %, greater than or equal to 20 wt. %, greater than or equal to 25 wt. %, or greater, based on the total weight of the composition. In some embodiments, the composition comprises the crosslinking agent in an amount less than or equal to 30 wt. %, less than or equal to 25 wt. %, less than or equal to 20 wt. %, less than or equal to 15 wt. %, less than or equal to 10 wt. %, less than or equal to 5 wt. %, less than or equal to 3 wt. %, or less, based on the total weight of the composition. Combinations of the above recited ranges are also possible (e.g., the composition comprises the crosslinking agent in an amount between greater than or equal to 1 wt. % and less than or equal to 30 wt. % based on the total weight of the composition). Other ranges are also possible.

In certain non-limiting embodiments in which the crosslinking agent comprises an anhydride moiety, the resin comprises the crosslinking agent in an amount between greater than or equal to 5 wt. % and less than or equal to 15 wt. % based on the total weight of the composition.

In some non-limiting embodiments in which the crosslinking agent comprises a silane moiety, the resin comprises the crosslinking agent in an amount between greater than or equal to 1 wt. % and less than or equal to 20 wt. % based on the total weight of the composition.

According to certain non-limiting embodiments in which the crosslinking agent comprises a multi-functional (meth) acrylate, the resin comprises the crosslinking agent in an amount between greater than or equal to 3 wt. % and less than or equal to 30 wt. % based on the total weight of the composition.

In certain embodiments, the composition may comprise an initiator (e.g., a photoinitiator). As would be understood by a person of ordinary skill in the art, the initiator may be used to promote a crosslinking and/or polymerizing reaction between one or more components of the composition. The initiator (e.g., photoinitiator) may require a relevant light source to initiate the crosslinking and/or polymerizing reaction, in some embodiments.

Any of a variety of suitable initiators may be utilized. The initiator may comprise a phosphine oxide, in certain embodiments. In some embodiments, for example, the initiator comprises a bisacrylphosphine oxide (BAPO) (e.g., phenylbis(2,4,6-trimethylbenzoyl)phosphine oxide) and/or diphenyl(2,4,6-trimethylbenzoyl)phosphine oxide (TPO). Other initiators are possible.

According to some embodiments, the composition may comprise an initiator package (e.g., a photoinitiator package). For example, in certain embodiments, an initiator package comprising any combination of the above initiators may be incorporated into the composition.

The composition may comprise the initiator in any of a variety of suitable amounts. In some embodiments, for example, the composition comprises the initiator in an amount greater than or equal to 0.1 wt. %, greater than or equal to 1 wt. %, greater than or equal to 1.5 wt. %, or greater, based on the total weight of the composition. In some embodiments, the composition comprises the initiator in an amount less than or equal to 2 wt. %, less than or equal to 1.5 wt. %, less than or equal to 1 wt. %, or less, based on the total weight of the composition. Combinations of the above recited ranges are also possible (e.g., the composition comprises the photoinitiator in an amount between greater than or equal to 0.1 wt. % and less than or equal to 2 wt. % based on the total weight of the composition). Other ranges are also possible.

In certain embodiments, the composition comprises one or more additives, such as a filler. In certain embodiments, the filler comprises silica (e.g., silica particles, fumed silica), glass (e.g., glass fibers), and/or carbon (e.g., carbon fibers). Other fillers are also possible.

According to some embodiments, for example, the composition comprises silica (e.g., silica particles) as a filler. The silica may advantageously be used to provide an object with increased strength (e.g., tensile strength), increased thermal resistance (e.g., heat deflection temperature), and/or increased viscosities. In some embodiments, the silica may advantageously absorb water. In some such embodiments, the silica in the resulting three-dimensional object formed by additive manufacturing may facilitate the uptake of water into the crosslinked polymeric network of the three-dimensional object and assist in the breakdown and/or solubilization of the three-dimensional object.

The silica particles may have any of a variety of suitable sizes. For example, in certain embodiments, the silica particles have an average characteristic dimension (e.g., an average diameter) greater than or equal to 0.1 micrometers, greater than or equal to 0.5 micrometers, greater than or equal to 1 micrometer, greater than or equal to 5 micrometers, or greater. In some embodiments, the silica particles have an average characteristic dimension (e.g., an average diameter) less than or equal to 10 micrometers, less than or equal to 5 micrometers, less than or equal to 1 micrometer, less than or equal to 0.5 micrometers, or less. Combinations of the above recited ranges are also possible (e.g., the silica particles have an average characteristic dimension between greater than or equal to 0.1 micrometers and less than or equal to 10 micrometers). Other ranges are also possible.

The silica particles may have any of a variety of suitable shapes. In some embodiments, for example, the silica particles comprise spheres, tubes, rods, and/or cubes. Other shapes are also possible.

The composition may comprise the silica (e.g., silica particles) in any of a variety of suitable amounts. In some embodiments, the composition comprises the silica in an amount greater than or equal to 1 wt. %, greater than or equal to 20 wt. %, greater than or equal to 40 wt. %, or greater, based on the total weight of the composition. In some embodiments, the composition comprises the silica in an amount less than or equal to 60 wt. %, less than or equal to 40 wt. %, or less, based on the total weight of the composition. Combinations of the above recited ranges are also possible (e.g., the composition comprises the silica in an amount between greater than or equal to 1 wt. % and less than or equal to 60 wt. % based on the total weight of the composition). Other ranges are also possible.

In some embodiments, the composition may comprise a polar solvent (e.g., a solvent with high dielectric constant). The polar solvent may, in some embodiments, advantageously improve the stability and printing performance of the composition. In certain embodiments, for example, the composition may include water, ethanol, methanol, acetone, methyl ethyl ketone, isopropanol, n-propanol, acetonitrile, dimethyl sulfoxide, dimethyl formamide, and the like.

The composition may comprise other additives. For example, in certain embodiments, the composition comprises one or more pigments and/or dyes (e.g., titanium oxide, carbon black), one or more dispersants and/or stabilizers, and/or one or more filler and/or toughening agents (e.g., silicone modifiers, polyethylene glycols, glycerin). Other fillers and/or additives may also be utilized.

A method of additive manufacturing is described, according to some embodiments. FIG. 1A shows, for example, a scheme depicting a method of additive manufacturing.

Referring to FIG. 1A, method 100, in some embodiments, comprises step 110 comprising providing a resin composition as described herein. In certain embodiments, method 100 comprises step 112 comprising forming a three-dimensional object from the resin composition by additive manufacturing. Additive manufacturing techniques may, in certain embodiments, include stereolithography and/or selective of fused deposition modeling. Other additive manufacturing techniques are also possible.

In some embodiments, during the additive manufacturing process, the polymerization and/or crosslinking of the resin formulation may occur via any of a variety of suitable techniques, including, but not limited to, photo-induced radical polymerization and/or exposure to curing energy (e.g., thermal curing and/or radiation). For example, in certain embodiments, the resin formulation may be exposed to a light source and a photoinitiator (as explained herein), electromagnetic radiation (e.g., actinic radiation, UV-vis radiation), and/or heat to initiate curing. Other polymerization and/or crosslinking techniques may also be utilized.

As described herein, according to some embodiments, the three-dimensional object comprises a plurality of ionic interactions between the ionic component and the oligomer and/or monomer (e.g., the urethane (meth)acrylate oligomer and/or monomer). In certain embodiments, the three-dimensional object comprises a plurality of covalent interactions between the ionic component, the oligomer and/or monomer (e.g., the urethane (meth)acrylate oligomer and/or monomer), and the crosslinking agent.

Referring again to FIG. 1A, method 100 may further comprise step 114 comprising exposing the three-dimensional object to water. The three-dimensional object may be exposed to water by at least partially immersing and/or submerging the three-dimensional object in water, in some embodiments. In certain embodiments, the three-dimensional object may be exposed to water by spraying and/or pouring water over and/or onto the three-dimensional object.

In certain embodiments, upon exposing the three-dimensional object to water, the three-dimensional object may absorb water. As described herein, it may be advantageous for the three-dimensional object to be absorb water in order to facilitate the breakdown and/or solubilization of the three-dimensional object when exposed to water.

The three-dimensional object may be capable of absorbing any of a variety of suitable amounts of water. In some embodiments, for example, the three-dimensional object is capable of absorbing water in an amount greater than or equal to 1% of the total weight of the object, greater than or equal to 20% of total weight of the object, greater than or equal to 50% of total weight of the object, greater than or equal to 100% of the total weight of the object, or greater. In certain embodiments, the three-dimensional object is capable of absorbing water in an amount less than or equal to 200% of the total weight of the object, less than or equal to 100% of the total weight of the object, less than or equal to 50% of the total weight of the object, less than or equal to 20% of the total weight of the object, or less. Combinations of the above recited ranges are also possible (e.g., the three-dimensional object is capable of absorbing water in an amount between greater than or equal to 1% and less than or equal to 200% of the total weight of the object, the three-dimensional object is capable of absorbing water in an amount between greater than or equal to 50% and less than or equal to 200%). Other ranges are also possible.

As described herein, the three-dimensional object is water-breakable and/or water-soluble, according to certain embodiments, such that the three-dimensional object breaks down and/or solubilizes when exposed to water. In some embodiments, at least a portion of the ionic interactions (e.g., between the ionic component and the oligomer and/or monomer) and/or the covalent interactions (e.g., between the ionic component, the oligomer and/or monomer, and the crosslinking agent) are broken upon exposure of the three-dimensional material to water. Such reactivity may, in some embodiments, result in the fragmentation of the crosslinked polymeric network, thereby providing multiple pieces of the three-dimensional object. According to certain embodiments, for example, water may react with (e.g., hydrolyze) one or more components of the three-dimensional object, such as the crosslinking agent, as described herein, thereby cleaving one or more intramolecular covalent bonds of the crosslinked polymeric network.

The three-dimensional object may breakdown into a plurality of particles, in certain embodiments. The plurality of particles may have any of a variety of suitable shapes and/or sizes depending on the initial size of the three-dimensional object and/or the compositional makeup of the resin formulation. In certain embodiments, at least a portion of the plurality of particles may be soluble in water. For example, in certain embodiments, after exposing the three-dimensional object to water, the three-dimensional object may breakdown into a plurality of particles after a first time period, followed by the plurality of particles dissolving in water after a second time period. In other embodiments, after exposing the three-dimensional object to water, the three-dimensional object may dissolve in water.

The breakdown and/or solubilization of the three-dimensional object may depend on any of a variety of factors. In some embodiments, for example, the breakdown and/or solubilization of the three-dimensional object depends on the composition of the resin formulation used to fabricate the three-dimensional object, the temperature of the water, and/or the amount of time that the three-dimensional object is exposed to water.

In certain embodiments, the breakdown and/or solubilization of the three-dimensional object may be initiated and/or facilitated by agitating the three-dimensional object and/or water. For example, in some embodiments, the three-dimensional object may be exposed to (e.g., at least partially submerged in) water, and the water may be stirred and/or sonicated.

The three-dimensional object may be exposed to water at any of a variety of suitable temperatures. In some embodiments, for example, the three-dimensional object is exposed to water at a temperature greater than or equal to 20° C., greater than or equal to 40° C., greater than or equal to 60° C., or greater. In some embodiments, the three-dimensional object is exposed to water at a temperature less than or equal to 80° C., less than or equal to 60° C., less than or equal to 40° C., or less. Combinations of the above recited ranges are also possible (e.g., the three-dimensional object is exposed to water at a temperature between greater than or equal to 20° C. and less than or equal to 80° C.). Other ranges are also possible.

The three-dimensional object may be exposed to water for any of a variety of suitable time periods. In certain embodiments, for example, the three-dimensional object is exposed to water for greater than or equal to 1 minute, greater than or equal to 30 minutes, greater than or equal to 1 hour, greater than or equal to 3 hours or greater. In some embodiments, the three-dimensional object is exposed to water for less than or equal to 6 hours, less than or equal to 3 hours, less than or equal to 1 hour, less than or equal to 30 minutes, or less. Combinations of the above recited ranges are also possible (e.g., the three-dimensional object is exposed to water for a time period between greater than or equal to 1 minute and less than or equal to 3 hours). Other ranges are also possible.

According to some embodiments, a three-dimensional object resulting from a resin formulation comprising a low amount (e.g., 40 wt. %) of the ionic component may be exposed to water for long time periods (e.g., 6 hours) in order to initiate the breakdown. Comparatively, a three-dimensional object resulting from a resin formulation comprising a high amount (e.g., 90 wt. %) of the ionic component may be exposed to water for shorter time periods (e.g., 30 minutes) in order to initiate the breakdown.

In certain embodiments, a three-dimensional object resulting from a resin formulation comprising a high amount (e.g., 30 wt. %) of oligomer (e.g., urethane (meth)acrylate oligomer) may be exposed to water at a high temperature (e.g., 50° C.) in order to initiate the breakdown. Comparatively, a three-dimensional object resulting from a resin formulation comprising a lower amount (e.g., 5 wt. %) of the oligomer (e.g., urethane (meth)acrylate oligomer) may, in some embodiments, be exposed to water at lower temperatures (e.g., room temperature, such as 22-25° C.) in order to initiate the breakdown.

In some embodiments, a three-dimensional object resulting from a resin formulation comprising a high amount (e.g., 30 wt. %) of oligomer (e.g., urethane (meth)acrylate oligomer) may be exposed to water for extended periods of time (e.g., 6 hours) in order to initiate the breakdown. Comparatively, a three-dimensional object resulting from a resin formulation comprising a lower amount (e.g., 5 wt. %) of the oligomer (e.g., urethane (meth)acrylate oligomer) may, in some embodiments, be exposed to water for shorter time periods (e.g., 30 minutes) in order to initiate the breakdown.

According to certain embodiments, a three-dimensional object resulting from a resin formulation comprising a low amount (e.g., 1 wt. %) of the crosslinking agent may be exposed to water at a low temperature (e.g., room temperature, such as 22-25° C.) in order to initiate the breakdown. Comparatively, a three-dimensional object resulting from a resin formulation comprising a high amount (e.g., 30 wt. %) of the crosslinking agent be exposed to water at higher temperatures (e.g., 50° C.) in order to initiate the breakdown.

Figure 1B:
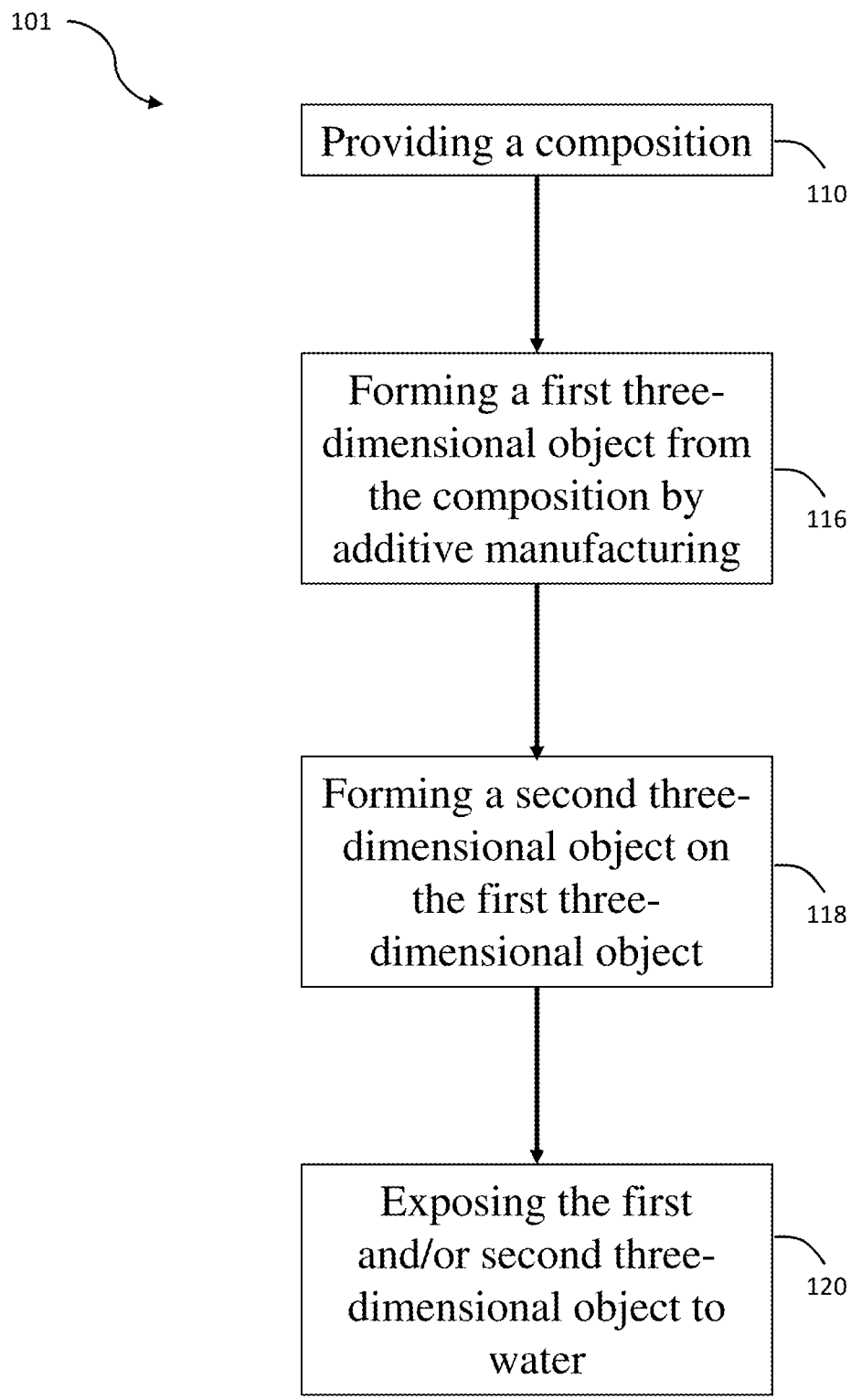
FIG. 1B shows, according to certain embodiments, a scheme depicting a method of additive manufacturing a first three-dimensional object and a second three-dimensional object.

As described herein, the three-dimensional object may be used as a support material. The support material may, in certain embodiments, be used as a support for the formation of a second three-dimensional object. FIG. 1B shows, according to certain embodiments, a scheme depicting a method of additive manufacturing a first three-dimensional object and a second three-dimensional object. In some embodiments, method 101 may comprise step 110, i.e., providing a composition as described herein. Step 116 comprises, in some embodiments, forming a first three-dimensional object (e.g., a support) from the composition by additive manufacturing.

In certain embodiments, method 101 comprises step 118 comprising forming a second three-dimensional object on the first three-dimensional object (e.g., the support). The second three-dimensional object may be formed on the first three-dimensional object by additive manufacturing, in some embodiments. As described herein, the second three-dimensional object may, in certain embodiments, be formed from the same resin formulation used to provide the first three-dimensional object. In other embodiments, the second three-dimensional object is formed from a different resin formulation, for example, a resin formulation that is not used to provide (e.g., by additive manufacturing) an object that is water-breakable.

In certain embodiments, method 101 may further comprise step 120 comprising exposing the first and/or second three-dimensional object to water. In some such embodiments, it may be advantageous for the second three-dimensional object to be provided from a different resin formulation (e.g., one that is not used to provide an object that is water-breakable) in order to easily break and/or dissolve the first three-dimensional object (e.g., the support) from the second three-dimensional object, in embodiments in which the second three-dimensional object is desired.

As described, the resin formulation may be used to provide a three-dimensional object by additive manufacturing. A suitable additive fabrication device may be used to additive manufacture the three-dimensional object.

Figure 2:
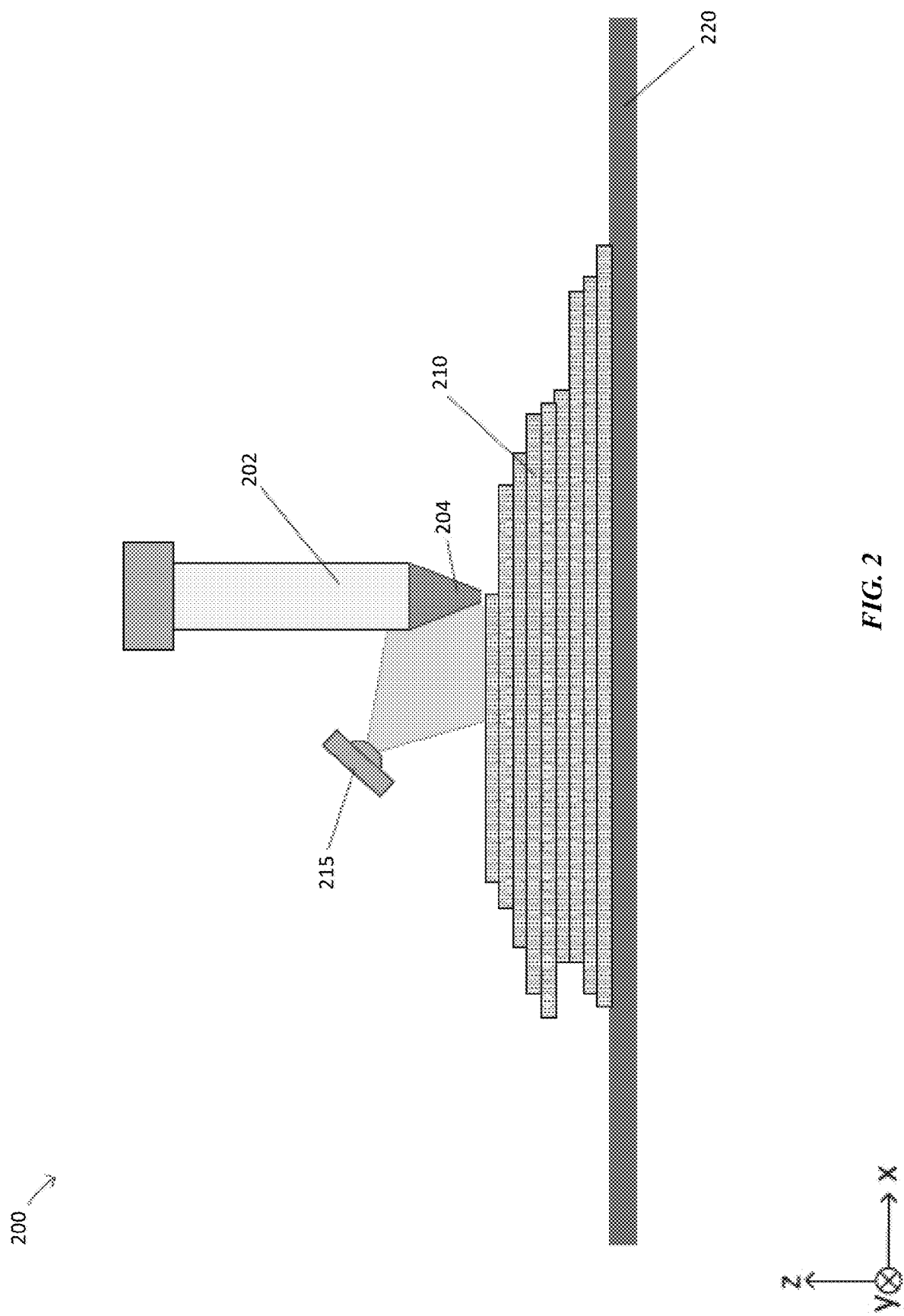
FIG. 2 is a schematic of an illustrative additive fabrication device configured to fabricate parts through photopolymer extrusion, according to some embodiments.

FIG. 2 is a schematic of an illustrative additive fabrication device configured to fabricate parts through photopolymer extrusion, according to some embodiments. Illustrative additive fabrication device 200 is configured to form layers of a solid material 210 by extruding a liquid photopolymer through a nozzle, which is then cured by a suitable source of actinic radiation. This technique of forming a part through extrusion and curing of a photopolymer may be referred to as "photopolymer extrusion," or "PE."

In the example of FIG. 2, an extruder 202 is configured to be operated to move within three-dimensional space relative to a build platform 220. In some embodiments, the extruder and/or the build platform may be coupled to a suitable multi-axis motion system that may be operated to produce relative motion, thereby allowing the extruder to be positioned at a desired position relative to the build platform. For instance, the extruder 202 may be coupled to two single-axis motion systems (e.g., systems configured to move the extruder along the x-axis and the z-axis), whereas the build platform may be coupled to a single-axis motion system (e.g., configured to move the build platform along the y-axis).

During operation, the additive fabrication device 200 may operate the extruder 202 (and/or build platform 220) by moving the extruder through desired positions relative to the build platform while extruding a photopolymer through a nozzle 204 of the extruder to form layers 210 of a part (e.g., a three-dimensional object). This aspect of operation of the additive fabrication device 200 may be similar to the process of extrusion of a thermoplastic in a fused filament fabrication (FFF) or fused deposition modeling (FDM) device, although the extruded material and mechanism for producing extrusion of the material may be different for PE compared with FFF or FDM.

In particular, the extruder 202 may comprise one or more pumps for causing a liquid photopolymer to be extruded through the nozzle 204. In some embodiments, the extruder may include (or may be coupled to) a positive displacement pump configured to meter liquid from a reservoir of liquid into the nozzle. In some cases, the reservoir may be pressurized. The nozzle may comprise a post metering volume, being an interior volume arranged between the pump and the output orifice of the nozzle 204. During metering, the pump may be operated to pump liquid into the post metering volume. Some volume of liquid may then be extruded out of the nozzle through its output orifice due to the increased pressure of the liquid within the post metering volume caused by said pumping of liquid into the post metering volume. The fabrication device may be configured to operate the pump to control an amount of liquid extruded out of the nozzle. For example, the fabrication device may operate the pump such that sufficient liquid is extruded out of the nozzle to form a layer of solid material with a target thickness.

In the example of FIG. 2, a source of actinic radiation 215 may be arranged to direct light onto the nozzle 204 and/or to an area in proximity to the nozzle. Actinic radiation emitted by the source 215 may thereby be incident onto liquid photopolymer extruded from the nozzle 204, either as it is extruded or a short time afterwards. The source 215 may be configured to produce actinic radiation that has suitable properties (e.g., a wavelength, intensity, etc.) to effect photocuring of the liquid photopolymer to be extruded through the nozzle. The actinic radiation may change physical properties of the liquid photopolymer (e.g., by creating cross-links between polymer chains). As a result, the source 215 may cure the extruded liquid to form solid material and thereby form layers 210. In some embodiments, the source of actinic radiation 215 may include one or more light emitting diodes (LEDs). In some embodiments, the source of actinic radiation 215 may be configured to emit ultraviolet light.

In some embodiments, the source of actinic radiation 215 and extruder 202 may be coupled to a common structure such that the source 215 and extruder 202 move together as a unit. For instance, the additive fabrication device 200 may comprise a gantry as part of a two-axis motion system and the source 215 and the extruder 202 may both be mounted to the gantry. In some embodiments, the additive fabrication device 200 may include multiple sources of actinic radiation 215 and some, but not all, of the sources may be coupled to the common structure. For example, a first source may be coupled to the common structure whereas a second source may be coupled to some other part of the device. In such a configuration, the first source may be constantly directed toward the nozzle, providing directed curing energy to material that has just been extruded from the nozzle, whereas the second source may more generally illuminate the area above the build platform to provide curing to at least some surfaces of the previously extruded material within the device.

The following examples are intended to illustrate certain embodiments of the present invention, but do not exemplify the full scope of the invention.

Example 1

The following example describes a resin formulation that can be used for additive manufacturing, for example, to provide a water-breakable object.

A resin formulation was provided using the components and amounts shown in Table 1. The resin formulation was used for stereolithography additive manufacturing to provide a three-dimensional object.

TABLE 1

Components and amounts for resin formulation.

| Component | Amount (based on the total weight of the composition) |
|---|---|
| Ionic component | 20-35 wt. % |
| Urethane (meth)acrylate monomer | 35-45 wt. % |
| Urethane (meth)acrylate oligomer | 35-45 wt. % |
| Crosslinking agent | 1-5 wt. % |
| Additives | 1-5 wt. % |

The properties of the three-dimensional object are shown in Table 2. Notably, a three-dimensional object with a glass transition temperature greater than 130° C. may be used as an investment casting and/or shell casting. The three-dimensional object was submerged in water at 20° C. and broke down within seconds and reached 50% disintegration in 1.5 hours.

TABLE 2

Properties for three-dimensional object.

| Property | Value |
|---|---|
| Tensile strength | 20-30 MPa |
| Tensile modulus | 1-3 GPa |
| Elongation at break | 1-10% |
| Flex strength at 5% strain | 30-50 MPa |
| Flexural modulus | 1-3 GPa |
| Shore hardness | 50D-80D |
| Glass transition temperature | >130 °C. |
| Time to 50% disintegration in water | 1.5 hours |

Example 2

The following example describes a resin formulation that can be used for additive manufacturing, for example, to provide a water-breakable object.

A resin formulation was provided using the components and amounts shown in Table 3. The resin formulation was used for additive manufacturing to provide a three-dimensional object.

TABLE 3

Components and amounts for resin formulation.

| Component | Amount (based on the total weight of the composition) |
|---|---|
| Ionic component | 70-80 wt. % |
| Urethane (meth)acrylate oligomer | 1-10 wt. % |
| Crosslinking agent | 5-10 wt. % |
| Additives | 1-5 wt. % |

The properties of the three-dimensional object are shown in Table 4. Notably, a three-dimensional object with a glass transition temperature greater than 190° C. may be used as an investment casting and/or shell casting. The three-dimensional object was submerged in water at 20° C. and broke down within seconds and reached 50% disintegration in 30 minutes.

TABLE 4

Properties for three-dimensional object.

| Property | Value |
|---|---|
| Tensile strength | 10-20 MPa |
| Tensile modulus | 0.5-2 GPa |
| Elongation at break | 15-30% |
| Flex strength at 5% strain | 40-50 MPa |
| Flexural modulus | 1-3 GPa |
| Shore hardness | 30D-50D |
| Glass transition temperature | >190° C. |
| Time to 50% disintegration in water | 30 minutes |

Example 3

The following example describes a resin formulation that can be used for additive manufacturing, for example, to provide a water-breakable object.

A resin formulation was provided using the components and amounts shown in Table 5. The resin formulation was used for stereolithography additive manufacturing to provide a three-dimensional object.

TABLE 5

Components and amounts for resin formulation.

| Component | Amount (based on the total weight of the composition) |
|---|---|
| Ionic component | 60-80 wt. % |
| Urethane (meth)acrylate oligomer | 10-20 wt. % |
| Urethane (meth)acrylate monomer | 10-20 wt. % |
| Crosslinking agent | 5-10 wt. % |
| Additives | 1-5 wt. % |

Example 4

The following example describes a resin formulation that can be used for additive manufacturing, for example, to provide a water-breakable object.

A resin formulation was provided using the components and amounts shown in Table 6. The resin formulation was used for photopolymer extrusion additive manufacturing to provide a three-dimensional object.

TABLE 6

Components and amounts for resin formulation.

| Component | Amount (based on the total weight of the composition) |
|---|---|
| Ionic component | 50-60 wt. % |
| Urethane (meth)acrylate oligomer | 1-10 wt. % |
| Urethane (meth)acrylate monomer | 1-10 wt. % |
| Crosslinking agent | 5-10 wt. % |
| Filler | 10-30 wt. % |
| Additives | 1-5 wt. % |

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A resin for additive manufacturing, the resin comprising:
    an ionic component in an amount between greater than or equal to 20 wt. % and less than or equal to 95 wt. % based on the total weight of the resin, wherein the ionic component comprises a vinyl, acrylate, methacrylate, or acrylamide moiety;
    an oligomer in an amount between greater than or equal to 1 wt. % and less than or equal to 45 wt. % based on the total weight of the resin;
    a monomer in an amount between greater than or equal to 1 wt. % and less than or equal to 45 wt. % based on the total weight of the resin; and
    a crosslinking agent in an amount between greater than or equal to 1 wt. % and less than or equal to 30 wt. % based on the total weight of the resin.

2. The resin of claim 1, wherein the ionic component comprises a positively charged ion.

3. The resin of claim 1, wherein the ionic component comprises a choline moiety.

4. The resin of claim 1, wherein the ionic component is methacroylcholine chloride.

5. The resin of claim 1, wherein the oligomer is water-dilutable but not water-soluble.

6. The resin of claim 1, wherein the oligomer is a urethane (meth)acrylate oligomer.

7. The resin of claim 1, wherein the monomer is a urethane (meth)acrylate monomer.

8. The resin of claim 1, wherein the crosslinking agent comprises an anhydride moiety and the resin comprises the crosslinking agent in an amount between greater than or equal to 5 wt. % and less than or equal to 15 wt. % based on the total weight of the resin.

9. The resin of claim 8, wherein the crosslinking agent is methacrylic anhydride.

10. The resin of claim 1, wherein the crosslinking agent comprises a silane moiety and the resin comprises the crosslinking agent in an amount between greater than or equal to 1 wt. % and less than or equal to 20 wt. % based on the total weight of the resin.

11. The resin of claim 10, wherein the crosslinking agent comprises an alkoxy silane moiety.

12. The resin of claim 10, further comprising an initiator.

13. The resin of claim 12, wherein the composition comprises the initiator in an amount greater than or equal to 0.1 wt. % and less than or equal to 2 wt. % based on the total weight of the resin.

14. The resin of claim 12, wherein the initiator is or comprises a bisacrylphosphine oxide (BAPO) and/or diphenyl(2,4,6-trimethylbenzoyl)phosphine oxide (TPO).

15. The resin of claim 1, wherein the crosslinking agent comprises a multi-functional (meth)acrylate and the resin comprises the crosslinking agent in an amount between greater than or equal to 3 wt. % and less than or equal to 30 wt. % based on the total weight of the resin.

16. The resin of claim 15, wherein the crosslinking agent is trimethylolpropane triacrylate (TMPTA), trimethylolpropane trimethacrylate (TMPTMA), pentaerythritol triacrylate, glycerol propoxylate (1PO/OH) triacrylate, and/or alkoxylated derivatives thereof.

17. The resin of claim 1, further comprising a filler.

18. The resin of claim 17, wherein the filler comprises silica particles having an average characteristic dimension between less than or equal to 10 micrometers and greater than or equal to 0.5 micrometers.

19. A method of additive manufacturing, the method comprising:
    providing a resin comprising:
        an ionic component in an amount between greater than or equal to 20 wt.% and less than or equal to 95 wt.% based on the total weight of the resin, wherein the ionic component comprises a vinyl, acrylate, methacrylate, or acrylamide moiety;
        an oligomer in an amount between greater than or equal to 1 wt.% and less than or equal to 45 wt.% based on the total weight of the resin;
        a monomer in an amount between greater than or equal to 1 wt.% and less than or equal to 45 wt.% based on the total weight of the resin; and
        a crosslinking agent in an amount between greater than or equal to 1 wt.% and less than or equal to 30 wt.% based on the total weight of the resin; and forming a three-dimensional object from the resin by additive manufacturing.

20. The method of claim 19, wherein the three-dimensional object is water-breakable.

21. The method of claim 19, wherein additive manufacturing comprises stereolithography or fused deposition modeling.

22. The method of claim 19, wherein the three-dimensional object comprises ionic interactions between the ionic component, the oligomer, and/or the monomer, and wherein at least a portion of the ionic interactions are breakable upon exposure of the three-dimensional material to water.

23. The method of claim 19, wherein the three-dimensional object comprises covalent interactions between the ionic component, the oligomer, the monomer, and/or the crosslinking agent, and wherein at least a portion of the covalent interactions are breakable upon exposure of the three-dimensional material to water.

24. The method of claim 19, wherein the three-dimensional object is a support, and the method further comprises forming a second three-dimensional object on the support.

25. The method of claim 19, further comprising exposing the three-dimensional object to water.

* * * * *